(No Model.)
F. SCHEBEN.
DEVICE FOR PREVENTING SLIPPING OF BELTS.
No. 591,500. Patented Oct. 12, 1897.
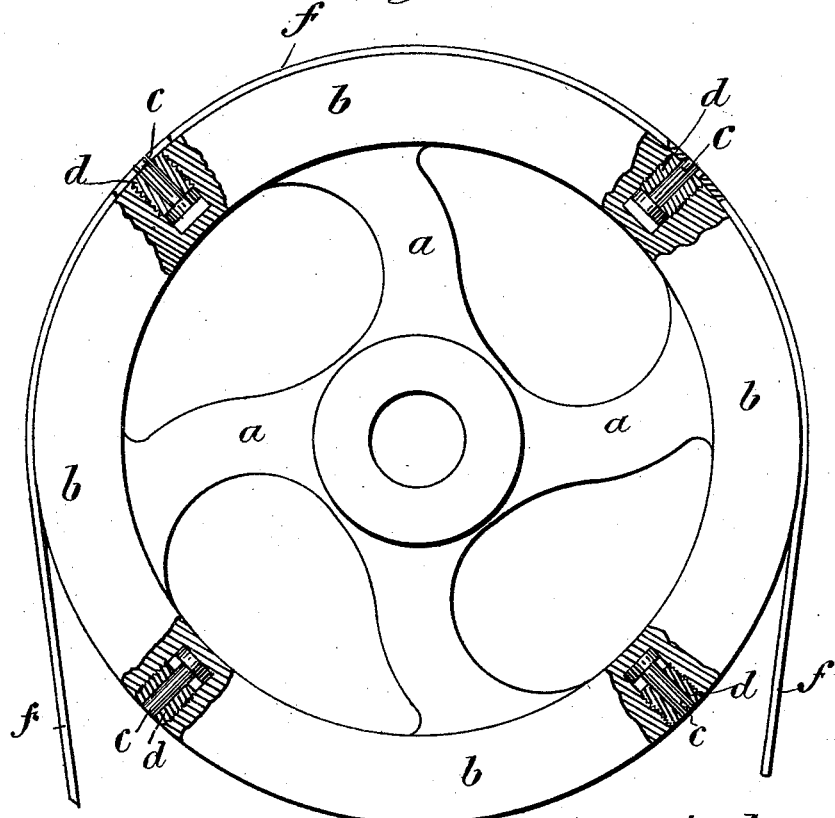
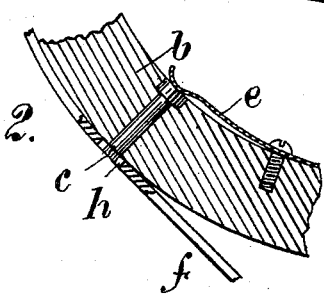
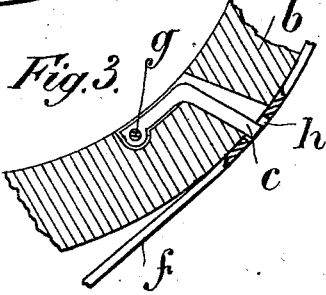
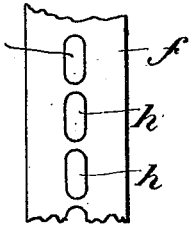
Witnesses:
Max Mayer.
Max Faller.
Inventor:
Franz Scheben
by the Attorney

UNITED STATES PATENT OFFICE.

FRANZ SCHEBEN, OF HENNEF, GERMANY.

DEVICE FOR PREVENTING SLIPPING OF BELTS.

SPECIFICATION forming part of Letters Patent No. 591,500, dated October 12, 1897.

Application filed March 22, 1897. Serial No. 628,802. (No model.)

*To all whom it may concern:*

Be it known that I, FRANZ SCHEBEN, a subject of the King of Prussia and Emperor of Germany, residing at Hennef-on-the-Sieg, in the Kingdom of Prussia, German Empire, have invented certain new and useful improvements in devices for preventing slipping of belts and the like on quickly-rotating pulleys, shafts, and similar parts of machinery; and I do hereby declare the following to be a full, clear, and exact description of the invention, such as will enable others skilled in the art to which it appertains to make and use the same.

With shafts, pulleys, and other quickly-rotating parts of machinery there arises, as is known, the drawback that the belts or their equivalents which serve for transmitting the power commence to glide as soon as a certain maximum of speed is surpassed, in consequence of which a part of the power applied is lost for the useful effect. To do away with this drawback, I combine the pulley or other rotary part with movable pieces that are held by or arranged within said part and are adapted to protrude beyond the rim of the latter and to lift the belt off the rim under the influence of the centrifugal force arising on the respective maximum of speed being surpassed. Owing to said lifting off of the belt the tension of this latter is correspondingly increased and its slipping prevented.

In order to make my invention more clear, I refer to the accompanying drawings, in which—

Figure 1 is a side view, partly in section, of a pulley constructed according to my invention. Fig. 2 is a similar view representing a slightly-modified form of construction. Fig. 3 shows another modification, and Fig. 4 represents a part of a perforated belt intended to be used with one or the other of said or other forms of constructions.

Referring to the form of construction shown in Fig. 1, a number of bolts $c$, having each a reinforced head, are inserted into radial bores of the rim $b$ and are held within said bores by aid of screwed seats or linings $d$ in such a manner that their ends can protrude beyond the peripheral surface when the bolts are acted on by a centrifugal force of such power as exists on the maximum of speed of the pulley getting surpassed. When this occurs, then the bolts press against the belt, lift it off the rim, and increase the tension of the same, and slipping of the belt is thus prevented. Up to this time or speed, however, the bolts do not act upon the belt, but are acted on—*i. e.*, pressed inward—by the same.

In the form of construction shown in Fig. 2 the seats or linings are dispensed with and springs $a$ are provided, which constantly tend to move the bolts outward. If the respective maximum of speed is reached, the belt is able to keep the bolts inward, overcoming the counteracting strength of the springs, but on said maximum being reached the centrifugal force imparted to the bolts coöperates with that of the springs, and the manner of action is then such as before described.

In the next form, Fig. 3, each bolt is formed into a kind of lever, the latter being fulcrumed at $g$. In this case the bolts or levers operate in exactly the same manner as the bolts of Figs. 1 and 2, as they are subjected, apart from the action of the belt, only to that of the centrifugal force.

Extended trials made with my novel device have met with a highly successful result, and have further shown that the belt which is to coöperate with the bolt, lever, or equivalent part need not indispensably be an ordinary one, but may be provided with perforations—for instance, such as $h$, Fig. 4—into which then take the protruding ends of the bolts, &c.

Having now described and ascertained the nature of this invention and in what manner the same is to be performed, I declare that what I claim is—

1. As a means for preventing a belt slipping on a pulley on the latter surpassing a certain maximum of speed, the combination with the pulley and the belt passing around its rim, of movable pieces held by said pulley and adapted to protrude beyond the rim and to lift the belt off said rim under the influence of centrifugal force arising on the maximum of speed being surpassed.

2. As a means for preventing a belt slipping on a pulley on the latter surpassing a certain maximum of speed, the combination with the pulley and the belt passing around its rim, of movable pieces held by said pulley and protruding beyond the rim, and springs tending to keep said pieces in this position; said springs having a strength allowing of being overcome by the pressure of the belt upon the protruding pieces at any speed below said maximum.

3. As a means for preventing a belt slipping on a pulley on the latter surpassing a certain maximum of speed, the combination with the pulley and the belt passing around its rim, of bolts arranged radially within said rim, and adapted to glide within suitable guides, substantially as described.

In testimony whereof I have affixed my signature in presence of two witnesses.

FRANZ SCHEBEN.

Witnesses:
   CHAS. KRÜGER,
   MARIA NAGEL.